(12) United States Patent
Mahalingaiah

(10) Patent No.: US 7,778,259 B1
(45) Date of Patent: *Aug. 17, 2010

(54) NETWORK PACKET TRANSMISSION MECHANISM

(75) Inventor: Rupaka Mahalingaiah, Austin, TX (US)

(73) Assignee: Dunti LLC, Austin, TX (US)

( * ) Notice: Subject to any disclaimer, the term of this patent is extended or adjusted under 35 U.S.C. 154(b) by 1101 days.

This patent is subject to a terminal disclaimer.

(21) Appl. No.: 10/866,358

(22) Filed: Jun. 11, 2004

Related U.S. Application Data

(63) Continuation-in-part of application No. 10/375,833, filed on Feb. 27, 2003, now Pat. No. 6,804,235, which is a continuation of application No. 09/785,899, filed on Feb. 16, 2001, now Pat. No. 6,587,462, and a continuation-in-part of application No. 09/571,027, filed on May 15, 2000, now Pat. No. 6,912,196, and a continuation-in-part of application No. 09/356,651, filed on Jul. 19, 1999, now Pat. No. 6,754,214, and a continuation-in-part of application No. 09/312,240, filed on May 14, 1999, now Pat. No. 6,788,701, application No. 10/866,358, which is a continuation-in-part of application No. 10/112,832, filed on Mar. 29, 2002, now abandoned, and a continuation-in-part of application No. 10/100,980, filed on Mar. 19, 2002.

(51) Int. Cl.
*H04L 12/28* (2006.01)

(52) U.S. Cl. ........................ 370/401; 370/407

(58) Field of Classification Search .................... None
See application file for complete search history.

(56) References Cited

U.S. PATENT DOCUMENTS 4,507,782 A 3/1985 Kunimasa et al.

(Continued)

FOREIGN PATENT DOCUMENTS

| EP | 0 403 973 | 12/1990 |
|----|-----------|---------|
| EP | 0 751 642 | 1/1997 |
| EP | 0 855 820 | 7/1998 |

OTHER PUBLICATIONS

Porwal, M.K.; Yadav, A.; Charhate, S.V.; Traffic Analysis of MPLS and Non MPLS Network including MPLS Signaling Protocols and Traffic Distribution in OSPF and MPLS, Jul. 16, 2008, IEEE, First International Conference onEmerging Trends in Engineering and Technology, 2008. ICETET '08. pp. 187-192.*

(Continued)

*Primary Examiner*—Jayanti K Patel
*Assistant Examiner*—Hooman Houshmand
(74) *Attorney, Agent, or Firm*—Charles D. Huston; Daffer McDaniel, LLP

(57) ABSTRACT

An architecture, system and method are provided for efficiently transferring packets of data across a communication network. Portions of the communication network is structured such that there are hierarchical levels of high speed Routing Switches existing throughout the network. Distributed routing of packets is achieved by comparing identification numbers of Routing Switches with the destination address of a data packet. Once routing is achieved within the transport ID based network, transfer to a destination termination device occurs through a single look-up table only when departing the network. The routing operation between termination devices can therefore be achieved using a single mapping operation and is backward compatible with devices external to the network and protocols used by those devices. Each Routing Switch thereby serves as a traffic manager, having registers that are configured so as to allow the traffic manager to direct packets of data from an input port to an output port in the quickest, most efficient manner without having to decode the entire destination address or requiring time-consumptive routing tables.

32 Claims, 9 Drawing Sheets

U.S. PATENT DOCUMENTS

| | | | |
|---|---|---|---|
| 4,538,026 A | | 8/1985 | Yasue |
| 4,615,028 A | | 9/1986 | Lewis et al. |
| 4,679,191 A | | 7/1987 | Nelson et al. |
| 4,707,827 A | * | 11/1987 | Bione et al. ............... 370/405 |
| 4,933,930 A | | 6/1990 | Lien et al. |
| 5,023,872 A | | 6/1991 | Annamalai |
| 5,095,480 A | | 3/1992 | Fenner |
| 5,134,610 A | | 7/1992 | Shand et al. |
| 5,175,765 A | | 12/1992 | Perlman |
| 5,319,644 A | | 6/1994 | Liang |
| 5,425,026 A | | 6/1995 | Mori |
| 5,434,914 A | * | 7/1995 | Fraser ............... 379/219 |
| 5,442,708 A | | 8/1995 | Adams et al. |
| 5,444,702 A | | 8/1995 | Burnett et al. |
| 5,485,455 A | | 1/1996 | Dobbins et al. |
| 5,509,000 A | | 4/1996 | Oberlander |
| 5,524,254 A | | 6/1996 | Morgan et al. |
| 5,548,646 A | | 8/1996 | Aziz et al. |
| 5,566,193 A | | 10/1996 | Cloonan |
| 5,568,482 A | | 10/1996 | Li et al. |
| 5,596,715 A | | 1/1997 | Klein et al. |
| 5,633,869 A | | 5/1997 | Burnett et al. |
| 5,682,479 A | * | 10/1997 | Newhall et al. ............... 709/242 |
| 5,721,819 A | | 2/1998 | Galles et al. |
| 5,757,924 A | | 5/1998 | Friedman et al. |
| 5,790,546 A | | 8/1998 | Dobbins et al. |
| 5,822,309 A | | 10/1998 | Ayanoglu et al. |
| 5,864,683 A | | 1/1999 | Boebert et al. |
| 5,884,024 A | | 3/1999 | Lim et al. |
| 5,970,232 A | | 10/1999 | Passint et al. |
| 5,999,991 A | | 12/1999 | Smith et al. |
| 6,006,090 A | | 12/1999 | Coleman et al. |
| 6,006,272 A | | 12/1999 | Aravamudan et al. |
| 6,119,171 A | | 9/2000 | Alkhatib |
| 6,122,278 A | | 9/2000 | Bell |
| 6,134,589 A | | 10/2000 | Hultgren |
| 6,157,967 A | | 12/2000 | Horst et al. |
| 6,170,025 B1 | | 1/2001 | Drottar et al. |
| 6,185,680 B1 | | 2/2001 | Shimbo et al. |
| 6,226,267 B1 | | 5/2001 | Spinney et al. |
| 6,237,061 B1 | | 5/2001 | Srinivasan et al. |
| 6,260,120 B1 | | 7/2001 | Blumenau et al. |
| 6,275,492 B1 | * | 8/2001 | Zhang ............... 370/392 |
| 6,275,494 B1 | | 8/2001 | Endo et al. |
| 6,292,492 B1 | | 9/2001 | Bonomi et al. |
| 6,304,552 B1 | | 10/2001 | Chapman et al. |
| 6,307,837 B1 | | 10/2001 | Ichikawa et al. |
| 6,356,551 B1 | | 3/2002 | Egbert |
| 6,373,837 B1 | | 4/2002 | Kleyman et al. |
| 6,377,575 B1 | | 4/2002 | Mullaney et al. |
| 6,389,532 B1 | | 5/2002 | Gupta et al. |
| 6,412,007 B1 | | 6/2002 | Bui et al. |
| 6,643,286 B1 | * | 11/2003 | Kapadia et al. ............... 370/389 |
| 2001/0010692 A1 | | 8/2001 | Sindhu et al. |
| 2002/0010793 A1 | | 1/2002 | Noll et al. |

OTHER PUBLICATIONS

Lucent Technologies, "CBQ Frequently-Asked Questions," www.xedia.com/products/cbq_faq.htm, last modified: May 26, 1999.

"Demystifying Bandwidth Management," © Lucent Technologies, Inc., pp. 1-12.

"Delivering Internet Access Quality of Service," © Lucent Technologies, Inc., pp. 1-8.

Antonio et al., "A Fast Distributed Shortest Path Algorithm for a Class of Hierarchically Structured Data Networks," © 1989 IEEE, pp. 183-192.

Tsuchiya, "Efficient Utilization of Two-Level Hierarchical Addresses," © 1992 IEEE, pp. 1016-1021.

Stevens, *TCP/IP*, Addison-Wesley 2000, pp. 37-45.

* cited by examiner

NETWORK PACKET TRANSMISSION MECHANISM

PRIORITY APPLICATIONS

The present application is a continuation-in-part of the following applications:

(1) U.S. patent application Ser. No. 09/312,240 filed May 14, 1999 now U.S. Pat. No. 6,788,701;

(2) U.S. patent application Ser. No. 09/356,651 filed Jul. 19, 1999 now U.S. Pat. No. 6,754,214;

(3) U.S. patent application Ser. No. 09/571,027 filed May 15, 2000 now U.S. Pat. No. 6,912,196;

(4) U.S. patent application Ser. No. 10/375,833 filed Feb. 27, 2003 now U.S. Pat. No. 6,804,235 which is a continuation of U.S. patent application Ser. No. 09/785,899 filed Feb. 16, 2001 now U.S. Pat. No. 6,587,462;

(5) U.S. patent application Ser. No. 10/100,980 filed Mar. 19, 2002; and (6) U.S. patent application Ser. No. 10/112,832 filed Mar. 29, 2002.

BACKGROUND OF THE INVENTION

1. Field of the Invention

This invention relates to a communication system ("network") and more particularly to a network of interconnected nodes and/or switches that allow fast decode or routing of packets within the network.

2. Description of the Related Art

A communication network is generally regarded as an interconnected set of subnetworks or subnets. The network can extend over localized subnets as an intranet, or can extend globally as an internet between one or more intranets. A communication network can therefore forward data within a localized network between termination devices extending to almost anywhere around the world. The termination devices include any data entry/retrieval system (e.g., telephone or computer), and a network includes a local and/or global interconnection of termination devices configured on one or more subnets.

The basic underpinnings of network operation is the various protocols used to communicate between termination devices. A popular foundation for those protocols is the Open System Interconnect ("OSI") model. Using that model or a derivative thereof, protocols can be developed which work in concert with each other. A popular communication protocol includes the Transmission Control Protocol ("TCP") and the Internet Protocol ("IP"). Protocols such as TCP/IP determine how the termination devices will communicate with each other over a network configured with or without internet connection.

Many popular protocols including TCP/IP deliver data across the network in the form of a packet. Each packet of a particular message may be sent across different routes of the network at the same time and then reassembled at the proper termination device. In order to ensure the packets are properly received, certain layers of the OSI protocol stack will wrap the data before the packet is sent across the network. For example, TCP can divide data into segments which are then placed into, for example, IP datagrams having a header which includes the IP address of the originating and receiving termination devices. The IP datagram and header is, therefore, a wrapped IP which gets further wrapped when transferring the IP wrapper from the network layer to the data link and physical layers. For example, the IP datagram can be further wrapped using a Point-to-Point Protocol ("PPP"), a popular such protocol being that which follows the Ethernet specification at the physical layer. Thus, it is not until the IP has been wrapped possibly several times will the TCP be forwarded across the network.

Coupled between subnets of a network are various classes of devices, including bridges, routers, and switches. Bridges and switches for the most part operate primarily in hardware and within the domain of the data link layer. Legacy routers, on the other hand, operate within the network layer and can be programmed and reconfigured to intelligently forward packets across the network according to the most optimal routing path. Although the distinction has become somewhat blurred with modern day network layer switches and bridges, it is still the primary intent that a switch and bridge be employed mostly in hardware. Based on configuration of the switch or bridge, all data packets received by a particular input port are routinely sent to any particular output port or ports. This operation can be quickly repeated each time a packet is received.

While switches are relatively fast and can send data from an input port to an output port with very little delay or lag time, switches do not have the capability to adapt to change in traffic conditions as do routers. Because routers can easily adapt to avoid traffic bottlenecks, routers employ look-up tables and fairly complex routing algorithms. Typical routers are based on a packet processor. The processor can be programmed to determine the most optimal connection between input and output ports of the router. Coupled to the processor is a memory bus and associated system memory, whereby routing tables can be stored in the system memory and are periodically fetched by the processor whenever a routing decision is to be made. Thus, when a packet is received on one port of the router, the processor will execute a look-up operation by fetching the appropriate table information from system memory. Most routing tables are dynamic, in that they constantly change as network traffic and conditions change, so that the processor can interconnect the ports in a way that is most efficient at that time. Dynamic routing tables can be built and re-built using various routing protocols, popular such protocols include Routing Information Protocol ("RIP") and Exterior Gateway Protocol ("EGP").

Periodically programming the routing tables may mean that one router on a network need not know the location of the physically closest router or its placement within the network. The router will simply route based on its existing routing table and the resulting look-up outcome. Such a system can be considered a non-relative or non-deterministic router topography. Non-deterministic routers tend to rely on the number of hops (i.e., the number of routers or gateways) when determining the most optimal routing path. Thus, while a router may know the number of additional routers on a given path, it does not necessarily know or have a link to the identity of those routers.

In most modern networks, a packet will travel more than 10 or 20 hops before arriving at its destination. As defined herein, a hop is equivalent to a traversal of a router or address translator. More specifically, a hop is defined as an operation that invokes a look-up or translation operation. When traveling across a network, a packet may be sent across numerous look-up or translation tables, and also through numerous switches, before arriving at its destination. Each of these look-up or translations adds to the latency of the packet transmission. It is generally recognized that transmission latency is lessened, and transmission bandwidth increased, if the number of hops is reduced. Therefore, it is desirable that the number of hops from one termination device to another termination device be minimal. This is due, in part, to the time-consumptive look-up (or address translation/modification) procedure performed by each router. Furthermore, since a particular router will not necessarily know the placement of all other routers of a network, each look-up table must include identification numbers or addresses for each of the other routers within the network—even those not within the optimal routing path. The destination address is compared against each of those identification numbers for each routing operation. If a network is quite large, the access times needed to perform a look-up from the packet processor to the system memory can be correspondingly long.

This problem is compounded with the advent of high-speed networks of one gigabits per second (Gb/s) or higher. Look-up techniques needed to render forwarding decisions on rather large look-up tables drastically reduces the benefits of using high speed networks. Many termination devices use high-speed physical media, such as Ethernet. Moreover, subnet loops which interconnect localized devices can use even higher speed signals such as, for example, Synchronous Optical Networks ("SONETs").

If the IP packets enter the input port of a router more quickly than that router can process those packets, the packets are sent to an input queue. The router generally processes packets from the queue in the order in which they are received. If the number of packets received exceeds the capacity of the queue, packets may be lost and may need to be re-sent. If the comparison between the IP destination and the routing table takes a significant amount of time, then it may be likely that numerous packets may be lost. Frequency of lost data would increase when bursts of data are being sent. The time needed to re-send packets deleteriously hinders the overall throughput of the network.

To improve the throughput of the networks, industry uses switches that can switch the packet to destined port without performing table lookup. The path is typically pre-established and the packets are switched without routing. This speeds up the packet transmission at the cost of flexibility and adoptability provided by the routers. Typically, switches operate on layer 2 MAC (or Ethernet) addresses. Industry has introduced layer 3 switches that perform some layer 3 functions but not routing.

It would be of benefit to introduce an improved switch having switching speeds of a conventional switch yet also having the adaptability of a router. The improved switch would avoid the throughput constraints of a conventional packet processor and system memory interface and, more importantly, the detriments of an extensive look-up table. The desired switch would be even more beneficial if it could maintain backward compatibility with the OSI model, protocols of that model, and address resolution used by various Address Resolution Protocols ("ARP"). Still further, the improved switch should desirably be used in an overall network that is deterministic as to the relative topological placement of each switch within that network. Thus, the switch could determine if it should wrap (or strip) incoming packets as an end switch or should pass-through packets as an intermediate or pass-through switch, both switches advantageously performing those functions with minimal time delay.

Packet transmission over today's network rely on routing or switching packets using public domain addresses such as IP address or Ethernet addresses. This is analogous to using street addresses to sorting and routing mail before the introduction of zip codes. To increase the efficiency, post office introduced the concept of zip code for mail sorting and routing. Street addresses are only used to deliver the mail to the street address after mail has arrived at the final destination post office.

It will be beneficial to introduce a similar mechanism to packet transport function in the networking world. The new mechanism should be able to work with popular protocols and should not introduce additional complexities.

Each routing node within the network needs to keep the routing information of the entire network or subnet current at all times for proper operations. In large networks of today, the networks are not static and they change frequently. The IP addresses are mobile and users can access a network from different locations at different times. This necessitates complex routing protocols that communicate routing information across the network.

It will be beneficial to have a network that can be dynamic and yet not require complex routing protocols to keep the network current.

SUMMARY OF THE INVENTION

The problems outlined above are in large part solved by a packet transport mechanism that uses independent numbering mechanism with distinct identification address ("transport ID") for transporting the packets thus eliminating look-up and complex operations at every intermediate point. Transport ID based network introduces logical grouping with positional structure to otherwise random network. The grouping may comprise of hierarchical, topological, physical, or other structures. Positions within each group are also identified in a transport ID based network. Each packet is embedded with the destination transport ID information when the packet enters the network and carries this routing information along with the data. This innovative transport ID based packet transmission mechanism will utilize the logical structure in a network, enabling simple distributed packet direction operations as the packet traverses through the network. This numbering mechanism used within a given network will enable relationship between the forwarding/directing devices ("modules") based on their position within the network.

The modules, due to an awareness of their position or location with respect to the transport ID based network, allow adaptive fast forwarding of packets across the network. The modules represent an improvement over conventional switches and/or routers. Instead of statically routing packets in the same manner each time, as in conventional switches, the modules include features of conventional routers, yet without the detriments of routers. The modules can forward and/or direct packets of data relatively fast (similar to conventional switches), and can dynamically change the forwarding path based on activity within the network. For sake of brevity in its description, the modules perform a hybrid of a switch/route function and are henceforth referred to as "Routing Switches." Routing Switches are similar to switches with respect to the speed at which they forward packets of data, and that they perform a selection function applicable to switches in general. However, it is recognized that the Routing Switches are altogether dissimilar from conventional switches, and are also dissimilar from conventional routers.

The network can be made up of numerous Routing Switches extending between termination devices. Each Routing Switch performs fast deterministic directing of packets across the network based on conditions of the network. This network with transport ID scheme can be placed within only a portion of a conventional network, a subnet of which is coupled to one or more termination devices. Regardless of where it is configured, the present network includes one or more of Routing Switches that are structurally related to one another. Each Routing Switch within the network is assigned one or more unique identification numbers (transport ID) that could potentially comprise of various fields, each representing network parameter such as a level of topological structure. For example, the most significant field of bits may be allocated to the highest topological level of the network, followed by the next most significant field allocated to the next highest level. This is analogous to telephone numbering scheme with area code field, local field, and individual telephone numbers. In the network with transport ID structure is provided with each level of topology. Structure is also provided within each level. The Routing Switches are organized according to some predetermined structure within a given level that is reflected in the field of the identification number corresponding to that level.

Routing can therefore be achieved by comparing a destination transport ID of the wrapped data packet with transport ID of the Routing Switch receiving the incoming packet. Routing Switches direct/forward data packets by determining the direction of flow of the incoming packet based on comparing (or decoding) the destination transport ID of the packet with the transport ID of the Routing Switch indicated by the Routing Switch's transport ID. As the result of this direction/forwarding operation, traditional routing methods are eliminated. Also, decoding operations eliminate routing in what was determined, at a higher level, to be an unused path. Decoding within lower levels can be restricted only to those Routing Switches that the higher levels point toward. Moreover, decoding can be accomplished in a fairly rapid manner and need not occur if a comparison at the higher level will direct the packet to another branch of lower level Routing Switches.

In this manner, each Routing Switch is assigned one or more identification number (transport ID) based on its relative position within the network. Accordingly, the transport ID based network can be thought of as having a relative routing topography absent the detriments of conventional routers. As the packets are directed to its next point and this continues until the packet reaches its destination, the network acts as a distributed router. At no one point entire routing is performed. The packets are directed towards its destination based on the destination transport ID. Instead of performing routing functions at every node in the network, the distributed router performs incremental routing functions at every node and the data forwarding function is achieved across the entire network.

Within the transport ID based network is at least one Routing Switch and, preferably, numerous Routing Switches interconnected to form an intranet, an interne, or a combination of both. The Routing Switches can be classified as an end Routing Switch, a pass-through Routing Switch, or an intermediate Routing Switch. The end Routing Switches are those that are configured to adjacent termination devices and are used to perform protocol wrapping functions as packets of data enter the transport ID based network, or strip protocol used by the transport ID based network when packets exit the network. The end Routing Switches also perform a routing function similar to intermediate Routing Switches or pass-through Routing Switches. The end Routing Switches, intermediate Routing Switches, and pass-through Routing Switches can be configured in hardware to be substantially the same, with only the programmed function being different based on where within the network the Routing Switches are placed. A Routing Switch can act as an end Routing Switch to terminating devices connected to it. It appears as an intermediate Routing Switch to packets passing through it. Each Routing Switch can comprise of an access block that communicates with the terminating devices and a network block that communicates with the network.

The access block is responsible for receiving packets from the terminating devices. It determines the destination transport ID of the final destination and embeds this transport ID to the incoming packet. It then passes the wrapped packet to the network portion. The network block receives wrapped packets from access portion. It also receives packets from the network that are passing through the Routing Switch. The network block determines the appropriate port based on the destination transport ID of a packet and directs the packet to that port.

A Routing Switch includes a minimum of one bi-directional port. The number of ports is scalable in that there may be one or more terminating ports and one or more network ports arranged in various configurations. The network block of the Routing Switch decides which packet received on an input port will be forwarded to which of the various output ports. The network block includes a decoder and various buffers. The decoder performs a comparison between the destination address and the identification number of that Routing Switch based on the position of that Routing Switch within the overall transport ID based network. The comparison and decision are based on the comparison represented as an incremental step in the distributed routing function (data forwarding function) of the network.

A shared or distributed buffer may be placed within the data flow path to receive a packet and to forward that packet to the appropriate port based on the destination address. Instead of forwarding the data into a buffer, the data can be selectively forwarded across one or more bypass conductors coupled in parallel across the buffer. Thus, a module which forms an intermediate Routing Switch or end Routing Switch can be configured with bypass operations applicable to a pass-through Routing Switch or a pass-through node, and the bypass paths are used to reduce latency in the Routing Switches. The buffer can also be contained with an end Routing Switch and configured with control information. Through a series of read or fetch operations, the buffer may be used to wrap an incoming packet and associated address with control information as well as an transport ID of the end Routing Switch.

The transport ID based network is one that is completely compatible with protocols currently used in, for example, the OSI model. Specifically, a conventional address resolution protocol can be used to determine the location of a destination termination device by comparing an address (e.g., IP address) broadcast over the transport ID based network. Once the destination termination device is found, the end Routing Switch within the transport ID based network that is linked to the termination device can also be found. The end Routing Switch nearest the destination termination device can be thought of as an exit end Routing Switch whose identification number is known. When packets of information are to be sent to the destination termination device, it is known that those packets will be targeted to the exit end Routing Switch and forwarding operations are achieved through a series of compare operations within intermediate Routing Switches. The entry end Routing Switch adjacent the entry termination device will wrap the physical media packet with the transport ID of the exit end Routing Switch. The packet can then be forwarded throughout the network without having to perform any look-up operations.

When the packet arrives upon the exit end Routing Switch, control information and transport ID is stripped from the packet and the original packet is delivered to one or more termination devices connected to the exit end Routing Switch. A mapping table may be used to forward the packet to a relatively small number of destination termination devices selectively linked to the exit end Routing Switch. If, however, only one termination device is linked to the exit end Routing Switch, then mapping is not needed and consequently, no translation need occur. The comparison or translation performed at the exit end Routing Switch occurs to bridge the gap between the transport ID network and any external protocol or domain, hence the translation is a full comparison. For example, a full 32-bit random IP address can be used to look-up a 48-bit Ethernet address of the termination device.

At each Routing Switch, only the transport ID of the Routing Switch is compared against the destination transport ID and, more importantly, no look-ups are needed in the forwarding operations. In particular, a self-compare operation occurs within each Routing Switch's decoder along the forwarding path. Only a small mapping operation may be needed by the exit Routing Switch when identifying which of the various destination termination devices connected to the exit end Routing Switch will receive data. The number of termination devices connected to the exit Routing Switch is significantly smaller than the sum total of Routing Switches or nodes within a network. Importantly, the extent of the translation table associated with the exit end Routing Switch is local to that Routing Switch's location within the network node and to the domain of the termination devices known to be connected to it. The mapping table is completely independent of the interior transport ID network and is based solely on a known relationship between an exit end Routing Switch and termination devices connected thereto. This allows the mapping table to be static for the most part. Any changes to this table are completely localized and does not require updating of other nodes and/or Routing Switches within the network.

The addressing mechanism thereby targets the exit end Routing Switch after performing a conventional address resolution protocol. When forwarding data back from the exit end Routing Switch via the termination device connected thereto, the forwarded data can be directed to the entry end Routing Switch via the entry end Routing Switch identification number placed on the packet received by the destination termination device. Accordingly, in a reply to the originating packet, no look-ups are needed. Only a relatively small mapping operation may be needed when forwarding the reply outside of the transport ID network (i.e., when forwarding the reply packet back to the originating termination device). Thus, if more than one termination device is linked to the end Routing Switches, only one mapping occurs when routing packets of data from the transport ID based network, either to the destination termination device or back to the origination termination device. All routing functions are achieved by a field-by-field comparison, much like a distributed routing operation.

The entry and exit end node identification numbers may be configured or re-configured such that they are recognizable to the termination devices connected thereto. For example, if the network is to receive Ethernet-based packets, then the access block of the entry and exit end Routing Switches are configured with identification numbers that are within the Ethernet address range. Since the network is structured, with successive nodes and/or Routing Switches being recognizable to each other, all other Routing Switches in the network are in the same addressing domain.

At the entry end Routing Switch, the incoming termination device address (e.g., Ethernet address) can be replaced with the Ethernet address of the entry end Routing Switch (i.e., the entry end Routing Switch identification number) in the data packet. The targeted or destination termination device recognizes that the data originating from the incoming termination device is that of the entry end Routing Switch and now knows to forward all replies to the identification number, or address, of that Routing Switch. When the reply reaches the originating entry end Routing Switch (i.e., exit end Routing Switch for the reply), the next highest level of protocol (e.g., IP address) address is used to identify 1 of possibly N termination devices attached to the entry end Routing Switch. This is a fairly simply reply translation, and the only look-up needed during the reply operation. The relatively simple look-up, like the request look-up preferably involves a small, static look-up table local only to the end Routing Switches. The only entries within the table are the next protocol level (e.g., IP within the protocol stack) relative to the physical protocol level (e.g., Ethernet) address mapping.

A traditional hop used by conventional routers may involve replacement of a lower level (e.g., Ethernet) source and destination address of the packet with the next destination Ethernet address. The next destination Ethernet address (or hop address) is determined by the routing table within the convention router, said table is dynamically managed by the network. The present Routing Switches replace the source address at the entry and destination address at the exit end Routing. Switch, but not for purposes of "hop" routing. Instead, the present Routing Switches merely allows for more than one termination device per entry-exit Routing Switch. If only one termination device is coupled to an end Routing Switch, then address translation, look-up or hop is not needed. Simply a 1-to-N or N-to-1 mapping occurs. In a conventional sense, a hop is not used. Instead, the exit end Routing Switch simply performs a mapping of 1-to-N when exiting the transport ID based network, provided of course that N termination devices are present. If only one termination device is present, or if routing functions are present in multiple termination devices, then the end Routing Switches need not perform any mapping whatsoever.

A Routing Switch can be configured to receive data from terminating devices that vary in speed, formats, or protocols. The modular connection of traffic managers can form an overall Routing Switch that is compatible with dissimilar protocols and transmission speeds for use in any desired network connection or multiple network connections. For example, the input port attributed with a first traffic manager can receive 1.0 gigabit Ethernet information, whereas another input port attributed with another traffic manager can receive 2.5 gigabit fiber optic information. Thus, each traffic manager includes buffers that not only receive and temporarily store packets, but also are used to interface with differing transmission speeds of packets forwarded to the input port and packets exiting from the output port.

In a typical network, routing information is stored and maintained by conventional routers. In a transport ID based network, packets carry the routing information with the wrapped transport IDs. Each node only maintains its transport ID information. They route the packets based on the transport ID information carried by the packet.

According to one embodiment, a communication network is provided. The communication network is a transport ID based network with distributed routing function comprising a plurality of interconnected Routing Switches. To enable distributed routing, each Routing Switch includes an identification number with topological information bifurcated into several groupings of bits, or fields. A first grouping of bits helps identify a first Routing Switch for receiving data of the network prior to a second grouping of bits identifying a second Routing Switch for receiving data from the first Routing Switch. The first Routing Switch can be considered as being within a first hierarchical level and the second Routing Switch can be considered within a second hierarchical level. The first and second hierarchical levels are not necessarily the highest level and second to highest level, but are simply two levels within the overall hierarchy. A decoder within the first Routing Switch can compare an address of the forwarded data or packet with the first grouping of bits if the address originates from a Routing Switch within a hierarchical level dissimilar from the first hierarchical level. Thus, the originating address is either in a hierarchical level above or below the first hierarchical level. The same can be said regarding a decoder within the second Routing Switch and its comparison function.

The first Routing Switch, or first set of Routing Switches within the first level, are connected upon or between a first set of loops that are associated with a first set of network nodes. Likewise, the second Routing Switch, or second set of Routing Switches within the second level, are connected upon or between a second set of loops that are associated with a second set of network nodes. According to one example, at least one network branch may be terminated at both ends by a Routing Switch within the first set of Routing Switches and a Routing Switch within the second set of Routing Switches to enable coupling of the first set of network nodes to the second set of network nodes to provide a selectable routing path. The network nodes and network branches can be thought of as extending at least partially between terminating devices to form a data flow path therebetween.

An addressing mechanism is contemplated for use within the network. The network thereby includes an entry end Routing Switch and an exit end Routing Switch. Both entry and exit end Routing Switches may be selectively coupled to a plurality of termination devices, one of which is an exit termination device or destination termination device to which one or more packets are currently being sent. Between the exit and entry end Routing Switches are a plurality of intermediate Routing Switches. The packet is compiled by the entry end Routing Switch to contain a destination address of the exit end Routing Switch. The packet is forwarded through the plurality of intermediate Routing Switches, with each intermediate Routing Switch having an identification number which points the packet to a successive one of the plurality of intermediate Routing Switches and finally to the exit end Routing Switch. The exit end Routing Switch performs the single mapping translation in order to forward the packet solely from the exit end Routing Switch to the exit termination device. Thus, while addressing within the transport ID network may be unique to that network, addressing outside of that network remains compatible with existing OSI layer protocols applicable to TCP/IP, ATM, and/or Ethernet, for example.

Yet further, a method is contemplated for routing data. The method includes compiling a packet comprising a destination address of the exit end Routing Switch and a source address of the entry termination device, and thereafter forwarding the packet from the entry termination device to the entry end Routing Switch. While maintaining the destination address, updating the source address to the address of the entry end Routing Switch while forwarding the packet from the entry end Routing Switch to the exit end Routing Switch, exclusive of look-up operations in the interim. While maintaining the source address, updating the destination address to the address of the exit termination device while routing the packet from the exit end Routing Switch to the exit termination device.

Before compiling the packet, an address resolution protocol may be broadcast from the entry termination device to the entry end Routing Switch, and thereafter to the exit end Routing Switch for finding the location of the exit end Routing Switch relative to the exit termination device. Within each Routing Switch is a traffic manager. The traffic manager may include a traffic controller which dispatches a series of read operations to memory coupled within a data flow path between the input and output ports of the Routing Switch. Thus, the memory may include control information placed therein during a configuration cycle. The memory may also temporarily store packets of data dispatched from the input port. The traffic manager reads the control information and the packets of data in a predefined sequence so as to compile a wrapped packet that can then be forwarded to the output port.

The memory comprises any media which can receive packets of data and thereafter transfer those packets. The memory may involve a buffer, comprising semiconductor memory, wherein the memory is coupled to a bus across which packets of data are forwarded. The memory is responsive to a control signal forwarded across a bus separate from the bus that transfers packets. Thus, the bus represents a routing path of the network. The traffic controller works in conjunction with memory, similar to a compiler, for reading packets of data from memory and wrapping that data with control information stored in another section of the memory. In addition to it managing traffic flow through the Routing Switch, the traffic controller also functions to control the allocation of various resources such as ports, bypass paths and buffers within the Routing Switch.

In addition to the memory (or buffer) a conductor may be coupled in parallel across the buffer. A configuration register associated with the traffic manager may be programmed to select routing of the data flow path across either the buffer or the conductor depending on the availability of the output port.

The method for wrapping a packet of data may therefore include temporarily storing a packet of data in memory located within the flow path of the packet. A set of read operations can be dispatched to memory for reading various addresses (destination and origination addresses), control information, and the temporarily stored packets, in order to form at least a portion of a wrapped data packet.

BRIEF DESCRIPTION OF THE DRAWINGS

Other objects and advantages of the invention will become apparent upon reading the following detailed description and upon reference to the accompanying drawings in which.

Figure 1:
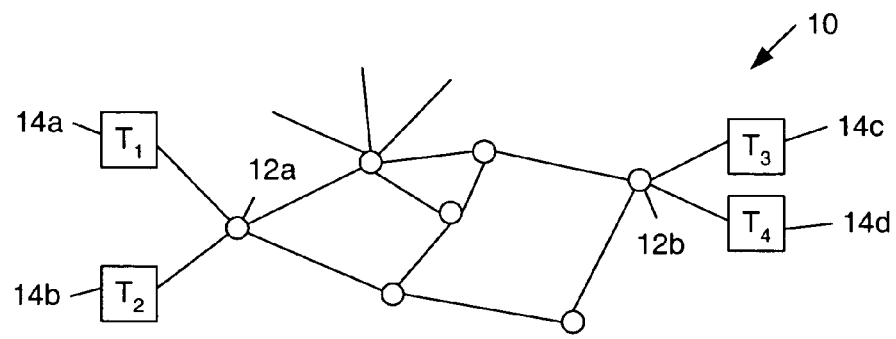
FIG. 1 is a diagram of a set of nodes within a network configured between termination devices.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the drawings, FIG. 1 illustrates a communication network 10. Network 10 includes an interconnection of subnets linked by nodes 12. Accordingly, network 10 can be thought of as one or more intranets or nodes 12 interconnected with one another, or interconnected via an interne.

Each node 12 can be thought of as embodying a subnet or a plurality of interconnected subnets. Select nodes 12*a* and 12*b* can be used to receive input or output data forwarded via termination devices 14. A termination device 14 includes any device which can forward input data or receive output data, popular forms of such input devices include a telephone or computer.

Figure 2:
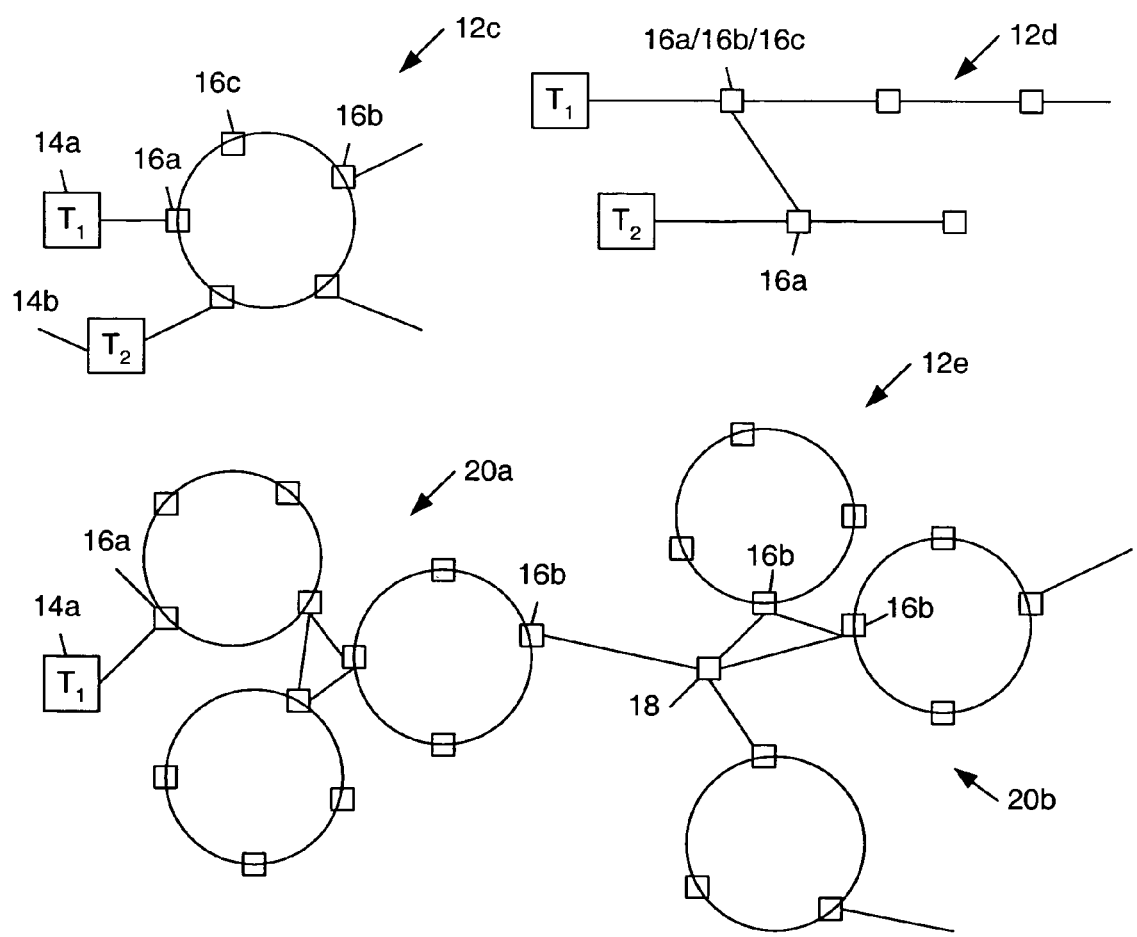
FIG. 2 are diagrams of a node configured according to a loop, multi-loops, multiple interconnected multi-loops or point-to-point topography, each configuration having a set of Routing Switches or modules interconnected with one another between loops or along a loop or backbone.

FIG. 2 illustrates exemplary forms of a node 12 and, more specifically, illustrates the connectivity and operation of modules or Routing Switches 16. For example, node 12*c* illustrates one example of a node comprising Routing Switches interconnected about a ring topography, oftentimes referred to as a "loop." Coupled to termination device 14*a* is a Routing Switch 16*a*, and coupled to Routing Switch 16*a* via the loop are Routing Switches 16*b* (pass-through) and 16*c* (intermediate), respectively. Node 12*d* illustrates a segment topography. As such, it is recognized that a node 12 or subnet can include either a backbone or ring topography, depending on the desired application.

The various nodes 12 can be classified as single nodes or multi-nodes, each of which can be an end node, a pass-through node or an intermediate node depending on where within the network they are arranged. The various Routing Switches 16 within each node 12 can act as an end Routing Switch, a pass-through Routing Switch or an intermediate Routing Switch based on their position within a network 10 and/or within a node 12 of the network. Further illustrated by node 12*d* is the interrelationship between an end Routing Switch 16*a*, or an intermediate/pass-through Routing Switch 16*b*/16*c*. More specifically, an end Routing Switch 16*a* can be configured solely as an end Routing Switch, or as a combination of an end Routing Switch and pass-through Routing Switch, or as an end Routing Switch, pass-through Routing Switch and intermediate Routing Switch, or any combination thereof. Thus, the Routing Switch modules 16 can be generic with specificity given during configuration based only on their position within the overall network 10. An end Routing Switch 16*a* for a set of termination devices 14 may appear as intermediate Routing Switch 16*a* for packets passing through the node 12. It is understood that a Routing Switch 16 may access physical media between termination devices 14 or subnets.

Node 12*e* in FIG. 2 illustrates two multi-loop combinations of Routing Switches 16, the multi-loops are indicated as reference numerals 20*a* and 20*b*. The various loops of each multi-loop 20 is shown interconnected by Routing Switch 16*b*, and the multi-loops 20*a*, 20*b*, and 12*e* are interconnected by Routing Switches 16*b*, as shown. It may be that one or more Routing Switches 16 of a node 12 are configured off the loop, as shown by reference numeral 18. Accordingly, it is to be noted that Routing Switches 16 can have almost any number of input and output ports, and can be configured either to wrap an incoming packet, strip an outgoing packet, and/or pass-through the packet with or without buffering, depending on where the Routing Switch 16 is in relation to the network topography or termination devices 14.

Figure 3:
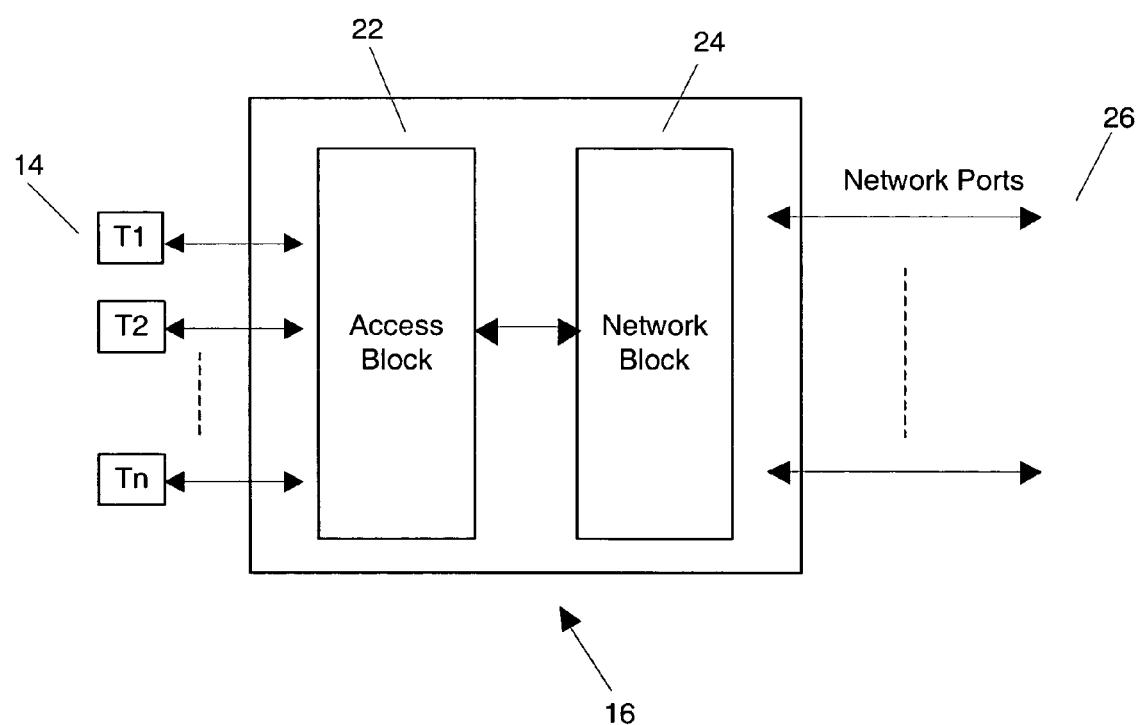
FIG. 3 is a block diagram of a Routing Switch.

Each Routing Switch 16 can be used to forward or route incoming packets received on an input port to one or more output ports. The incoming packets can be received over any type of media, including wired media or wireless media. FIG. 3 illustrates an exemplary module configured as Routing Switch 16. An access block 22 connects to terminating devices 14. Access block 22 receives packets from the terminating devices 14, determines the exit Routing Switch and embeds the exit Routing Switch transport ID to the incoming packet along with control information, as shown in FIG. 2. A network block 24 receives the packets from access block 22. Network block 24 also receives packets from other Routing Switches on the network through network ports 26. Network block 24 determines the optimal route for a given packet and directs the packet towards either network port 26 or termination devices 14. Packets destined to termination devices 14 are received by access block 22 which strips the transport ID and control information and delivers the packet to an appropriate termination device 14.

Figure 4:
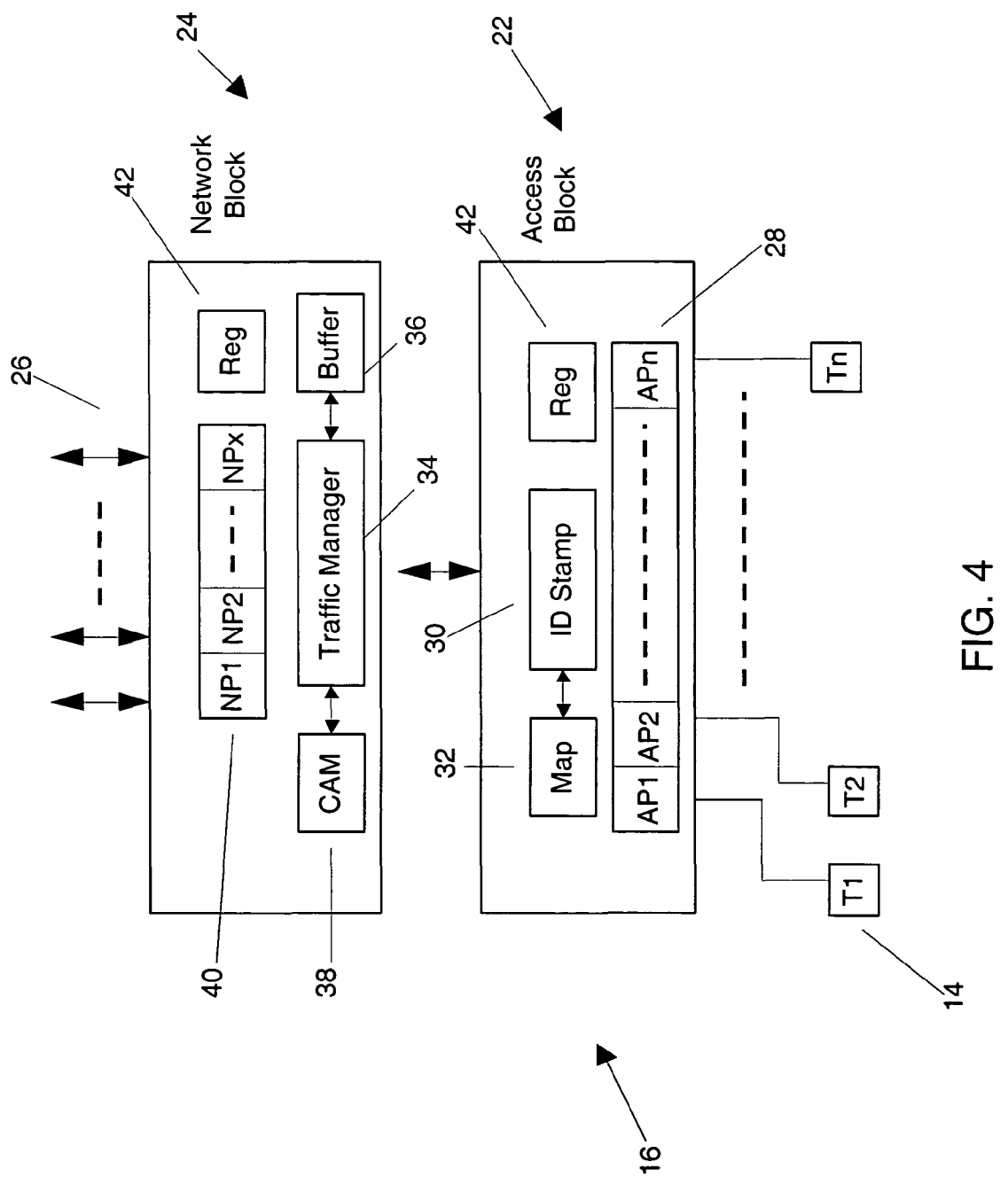
FIG. 4 is a detailed block diagram of an access block and network block of a Routing Switch comprising of port managers coupled to buffers and control logic.

FIG. 4 illustrates Routing Switch 16, shown in further detail. Access block 22 connects to multiple termination devices 14 via an access processor 28. Access processor 28 is responsible for providing connectivity to various industry standard protocols to the transport ID based network. Access processor 28 may be used to interface between a wire (i.e., copper) conductor physical media and fiber optics. Access processor 28 may also be used to detect a valid packet, serialize/de-serialize the packet, and perform other basic functions associated with traditional MACs. Access processor 28 may also perform the traditional function of network layer devices. An ID stamp 30 will receive a packet from access processor 28. It may then extract the destination address from the packet and use it to look up the transport ID (FIG. 5) of the destination Routing Switch stored in a map 32. Map 32 may also contain other control information. ID stamp 30 will stamp the packet with destination transport ID along with other control information and deliver the packet to network block 24.

Network block 24 comprises of a traffic manager 34, a CAM 38, a buffer 36, and a network processor 40. Traffic manager 34 is responsible for directing the packets to their destination ports 26. CAM 38 contains information for routing the packets that will be accessed by traffic manager 34 while making packet transport decisions. Buffer 36 will be used to store the packets while they are being routed to appropriate port 26. Buffer 36 may assist in congestion management such as more than one packet accessing the same resource at the same time. Network processor 40 is responsible for providing connectivity to the transport ID based network. Network processor 40 may be used to interface between a wire (i.e., copper) conductor physical media and fiber optics. Network processor 40 may also be used to detect a valid packet, serialize/de-serialize the packet, and perform other basic functions associated with traditional MACs. Access processor 40 may also perform the traditional function of network layer devices.

Traffic manager 34 functions to direct incoming data to an appropriate output port 26. It determines the output port for an incoming data packet based on a simple algorithm. The traffic manager is aware of its position relative to the network and its neighboring traffic managers or nodes. Based on this knowledge, the traffic manager 34 determines the appropriate output port 26 in accordance with the pre-determined algorithm. The traffic manager 34 also interfaces between ports 26 of different media, speed, and direction. After the output port assignment is made, the traffic manager 34 can: (i) store the data in buffer 36 if the incoming data is slower than the speed of the directed-to output port, until there is sufficient data to sustain the speed of the output port, (ii) forward the data without an intervening storage if the output port is free or if the incoming data is at the same speed as the output port, or (iii) transfer the data through a FIFO type storage device when the incoming data is coming at a faster rate than the speed of the output port. The traffic manager 34 manages resource allocation, such as allocation of various output ports and buffers, and the algorithms make decisions regarding allocation to reduce the latency through the traffic manager. A critical flow path for achieving extremely low latency across the Routing Switch 16 is to forward incoming data from a port to the output of the same port.

Within access block 22 and network block 24 are configuration registers 42. Configuration registers 42 receive configuration information, preferably during initiation of power to Routing Switch 16. Alternatively, registers may be formed as an SRAM. Still further, registers may include a PROM or ROM permanently programmed by the network installer. Contained within each register are bits used to program and set a given Routing Switch 16 to perform certain functionality.

Within configuration registers 42, bits may be programmed to enable transfer of all packets from port A to port B, for example. Other bits programmed within the various registers include an identification number attributed to that particular Routing Switch. Each Routing Switch 16 within a network 10 has a corresponding unique identification number transport ID. The transport ID signifies the relative location of the node 12 with respect to other nodes in the transport ID based network structure. The identification numbers of all Routing Switches 16 within the network contain bits bifurcated into fields and, as described herein below, each field corresponds to a particular topological structure. By introducing these transport IDs that contain topological information, network is introducing a logical structure on random network.

Figure 5:
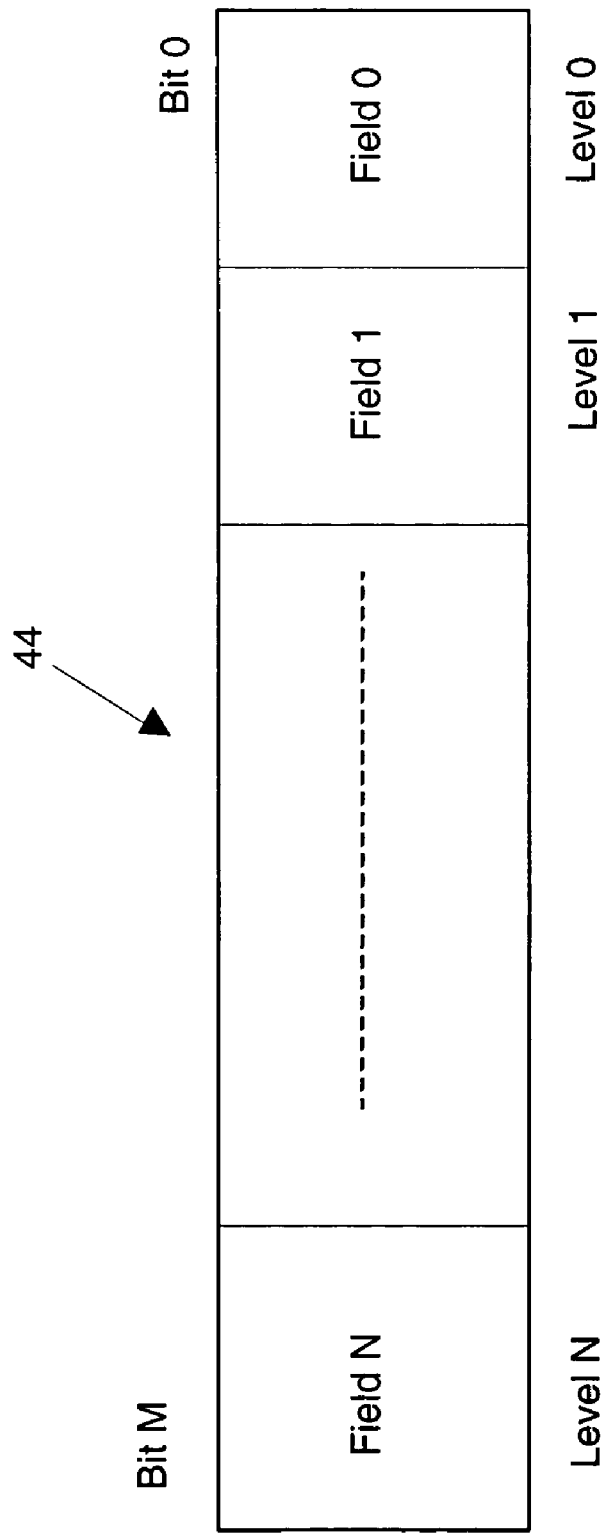
FIG. 5 is a transport identification number transport ID that is assigned to Routing Switches.

FIG. 5 illustrates the format of bits representing a Routing Switch identification number transport ID 44. The same format is used as a destination address of a wrapped packet forwarded through the structured, transport ID based network hereof. Each Routing Switch 16 within the network 10 contains a transport ID number programmed within the configuration registers the access block 22 and network block 24 of the Routing Switch. Transport ID 44 comprises of a M bit number that is divided into N fields where N may be 1 or a greater integer number. Each field in the transport ID 44 may be made to represent a level in the topological structure of the network. In the format shown, field N may include X number of bits which can therefore accommodate $2^X$ number of transport ID and hence Routing Switches 16 within level N of the transport ID based network. Similarly, level N−1 may have Y bits and there can be $2^X$ level N−1 groups and each of these groups in level N−1 can have $2^Y$ number of transport IDs. Given that field N corresponds with the top level topological structure, any routing beginning at that level entails decoding field N address of the incoming data with field N identification numbers before decoding the next level (field N−1).

Figure 6:
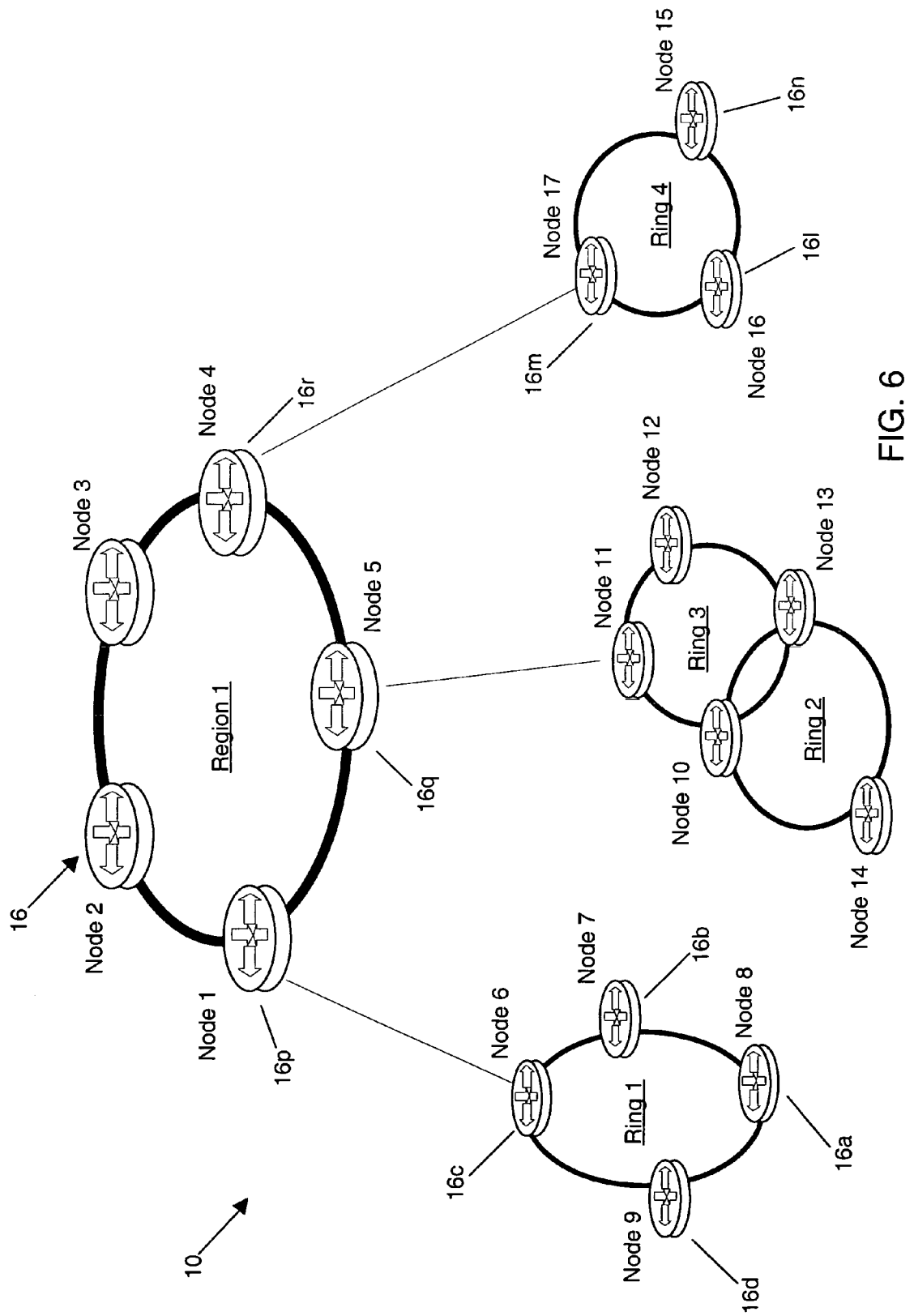
FIG. 6 is a logical diagram of nodes and associated Routing Switches arranged within levels, each level indicating a field of bits unique to Routing Switches within that level.

In FIG. 6, the network 10 represents a sample network that is indicated as comprising ring topology at each level. Other embodiments may use other topologies like tree, mesh, or linear. Yet other embodiments might use combinations of various topologies. When a packet from node 7 needs to travel to node n15, routing algorithms may route the packet through 16b-16c-16p-16q-16r-16m-16n. At each node, the router needs to access the routing tables and determine the next destination port for the packet. Thus the packet will be routed at every node resulting in seven hops before the packet reaches the destination node in a traditional network of today. Even though there is a physical structure in the network topology, the industry standard addressing mechanisms such as IP that are used for packet routing does are assigned randomly. Traditional routers typically do not make use of the topology of the network.

In one embodiment, this invention makes use of the inherent topology in the network and assigns transport ID to each node within the network. In another embodiment of a network with no structure, transport ID based network introduces logical groupings and positioning for each node by assigning transport IDs. This logical grouping and positioning is used by the transport ID based system to direct the packets.

Referring to FIGS. 5 and 6 in combination, one example of a transport ID 44 based packet transmission mechanism is provided. The network 10 is indicated as a transport ID based network with two levels of ring structure of possibly numerous levels. The top-level ring is represented by Region1 and the next level rings are represented by Ring1, Ring2, Ring3, and Ring4. Each Routing Switch 16 is configured with one or more unique transport ID in the network 10. Every Routing Switch 16 in the network 10 may be assigned a three-field transport ID 44 that is unique to this network. The transport ID of Routing Switch 16a in this system may comprise of three fields represented as 'Region1.Ring1.Node8', while the Routing Switch 16n may be have a transport ID of 'Region1.Ring4.Node15'. These transport IDs introduce topological structure to the network, logically dividing the nodes to rings and regions. Within each field of the transport ID, the numbering reflects the topology of that level. For instance, within Ring1, Routing Switches 16 are assigned clockwise incremental numbers such as Node 6, Node7, Node 8, and Node 9. The transport ID 44 of a Routing Switch signifies the relative location of that Routing Switch within that network. The structural information of the entire network is reflected in the transport ID. Thus, the packets traversing within the network carry the destination transport ID with embedded routing information. This enables simplifying complex routing functions to simple comparison and forwarding.

In the example of FIG. 6, when a packet destined to a termination device connected to Routing Switch 16n enters access block of Routing Switch 16a, the destination transport ID 44 is determined from the map lookup (see FIG. 4) and the packet is stamped with destination transport ID 'Region1.Ring4.Node15'. The packet is then passed on to the network block of 16a. The network block of Routing Switch 16a compares the destination ID of the packet to its local transport ID 'Region1.Ring1.Node8'. The comparison shows that the packet belongs to another ring of the same region. The packet is sent towards the ring gateway Routing Switch 16c via 16b. The network block of Routing Switch 16b compares the destination transport ID of the packet and passes it to Routing Switch 16c. The network block of Routing Switch 16c passes the packet to Routing Switch 16p. The packet is further forwarded across the network via Routing Switches 16q, 16r, 16m, and finally to 16n. At each of the intermediate nodes, the Routing Switches 16b, 16c, 16p, 16q, 16r, and 16m perform no lookup and no routing needs to take place. The packet is simply directed towards its destination based on simple comparison of the destination transport ID of the packet with the local transport ID.

When the packet reaches the network block of Routing Switch 16n, the comparison of the destination transport ID and local transport ID matches and hence the packet is passed to the access block of Routing Switch 16n (FIG. 4). The access block 22 removes the destination transport ID 44 and other control information and delivers the packet to the appropriate termination device 14 (not shown in FIG. 6). Thus the information needed to route the packet is carried with the packet instead of each nodes needing to generate and maintain routing tables and perform lookup operations. This precludes the necessity to distribute routing information to all nodes as required in traditional networks. The transport IDs are assigned dynamically by loading the local transport ID into the configuration registers 42. This enables simple updates and modification to accommodate the dynamic nature of the network. Complex routing algorithms are replaced by simple static map table updates in a transport ID based network.

In one embodiment, the transport IDs may be independent of standard protocol addressing mechanisms like MAC and IP addresses. In another embodiment, MAC or IP addresses can be sued as transport ID.

In one embodiment, a Routing Switch can belong to more than one structure such as ring. A Routing Switch can be configured to be part of two adjacent rings such as Node 10 of FIG. 6. In this case, the Routing Switch can have multiple local transport IDs, one each for each structure. Such Routing Switch with more than one local transport ID may compare the incoming packet's destination transport ID to one or more of its local transport IDs and direct the packet to appropriate port or structure such as ring.

Figure 7:
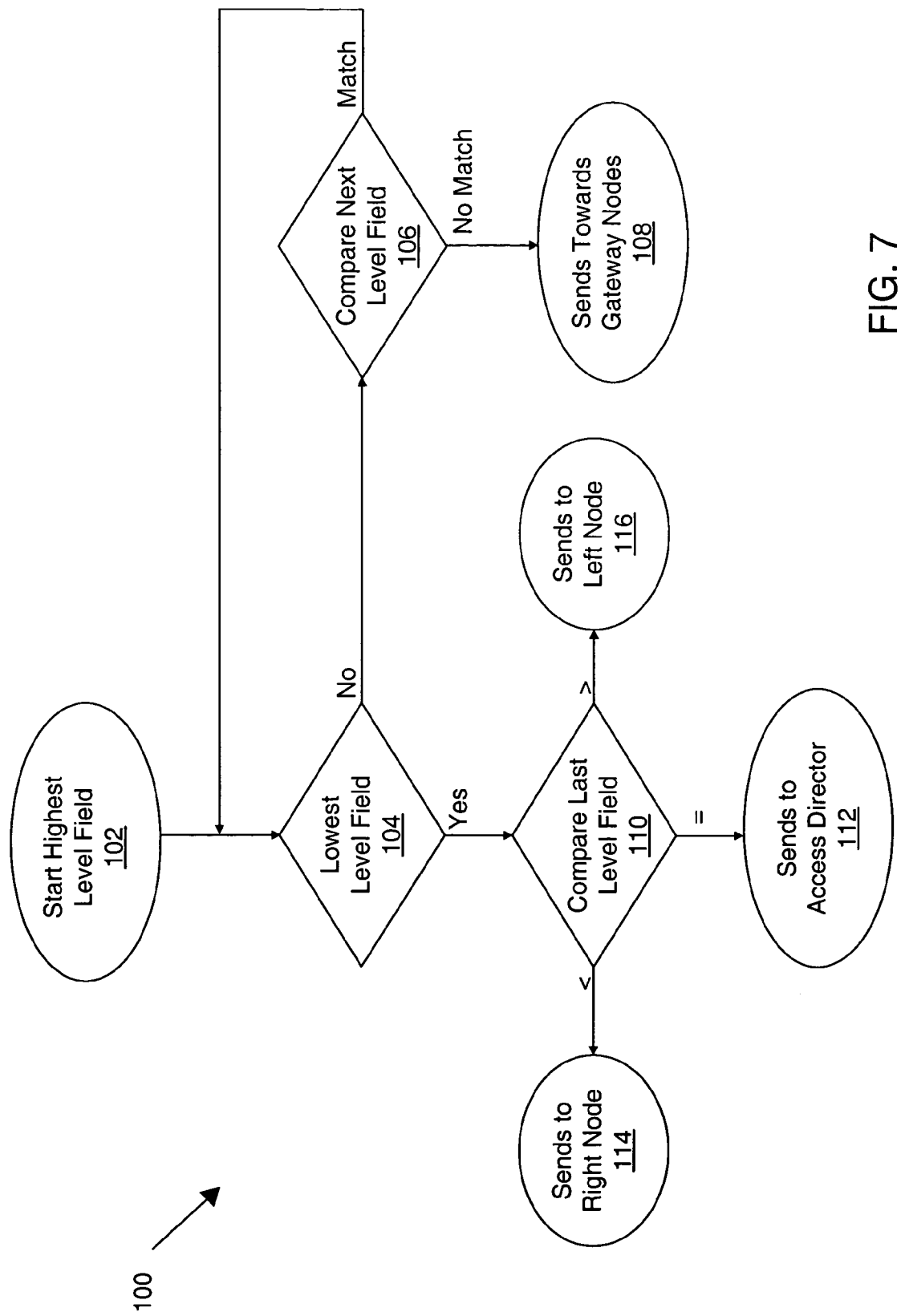
FIG. 7 is a depicts the steps involved in comparing the destination Transport ID of a packet with the local transport ID.

FIG. 7 illustrates a flow chart 100 of the destination transport ID comparison with the local transport ID process in a Routing Switch 16. The comparison starts at the highest-level field 102. It is checked if this is the lowest-level field as shown in 104. If it is not the lowest-level field, next field is compared as shown in 106. If there is a match, the process continues to compare the next field until either the lowest-level field is reached or a mismatch of one of the higher-level field occurs. This mismatch signifies that the packet is destined to a Routing Switch 16 outside the current level structure. The packet is then directed towards one of the designated gateway Routing Switches 16 as shown in 108. When comparing the lowest-level field 110, if there is a match, the packet is forwarded to the access block of that Routing Switch 16 to be forwarded to appropriate termination device 14 as shown by 112. For a ring and linear topology, the lowest-field of destination transport ID is checked to see if it is greater or less than the local transport ID. If it is greater, the packet may be sent to the right (or left) neighbor Routing Switch 114 and if it is less, it may be sent to the left (or right) neighbor Routing Switch 112 (as shown in FIG. 7). For a mesh topology, there could be a range of number for each possible port.

In one embodiment entire destination transport ID 44 can be compared to the local transport ID of a Routing Switch in single integrated operation. This will be beneficial in the case where transport IDs are fairly small and/or when the logic performing the operation can complete it at minimal time.

This comparison of destination transport ID to local transport ID reduces the routing functionality to simple comparison operation. This relatively fast decode operation performs routing function within the transport ID based network. The concept of being aware of the locations of all the Routing Switches within the network is of primary importance when forwarding the packets. This awareness in the transport ID based network 10 of the present invention is beneficial in all topologies. For instance, based on the identification number indicating where the Routing Switch is located, and the destination address, the packet can be sent around the local loop among the interconnected Routing Switches, either right of left. In a mesh topology, this simple comparison will direct the packet to one or more arms of the mesh. In tree topology, this comparison could direct the packet upwards towards the top or distribute it across the branches.

Figure 8:
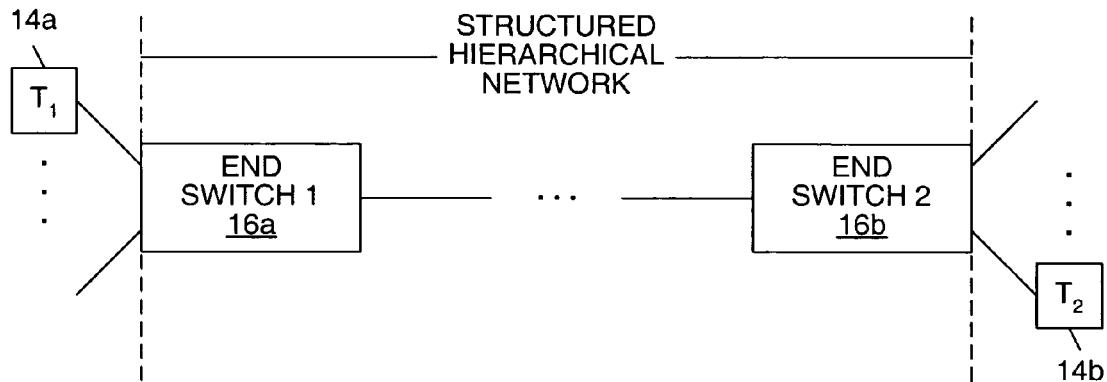
FIG. 8 is a block diagram of end Routing Switches placed on opposing ends (i.e., periphery) of the structured, hierarchical network, each end Routing Switch is shown linked to at least one termination device.
Figure 9:
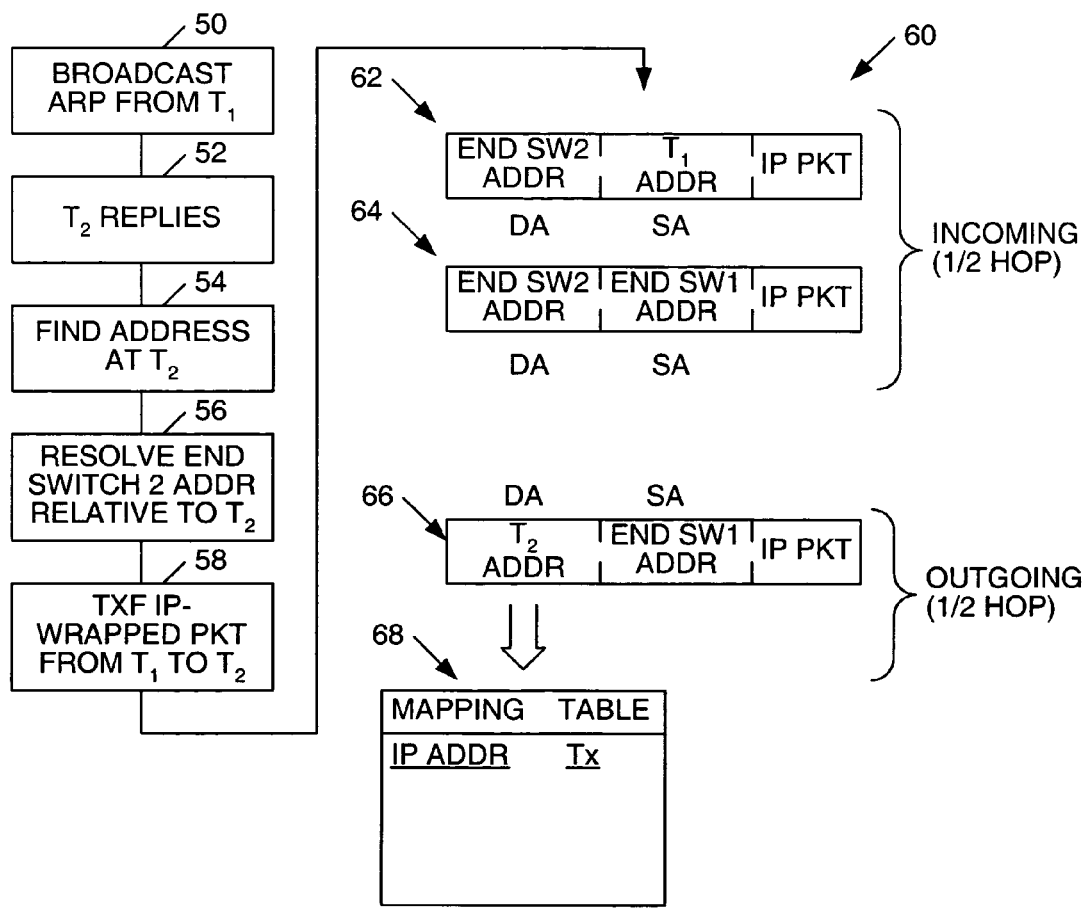
FIG. 9 is a diagram illustrating resolution of an end Routing Switch address relative to a targeted termination device, and the routing of data through the entire transport ID based network without involving a hop or look-up operation, except for a relatively small mapping to possibly N number of targeted termination devices.

FIGS. 8 and 9 in combination, show path routing outside of the transport ID based network. That is, while structured positioning and fast decoding performs distributed routing within the network, identification of a routing path to and from termination devices must be established. Coupled to termination devices 14a and 14b are end Routing Switches 16a and 16b, shown in FIG. 8. If device 14a is the originator of a packet, then end Routing Switch 16a can be considered an entry end Routing Switch. If the incoming packet includes a destination address to termination device 14b, then device 14b is considered the targeted or destination termination device, and end Routing Switch 16b is considered an exit end Routing Switch.

From the example of FIG. 8, FIG. 9 illustrates firstly, a mechanism for identifying the relationship between termination devices 14 and end Routing Switches 16 (particularly when there are multiple termination devices per end Routing Switch) and, secondly, how the incoming packet is routed from the originating termination device to the destination termination device 14a and 14b, respectively.

Referring to FIG. 9 in more detail, an Address Resolution Protocol ("ARP") may be broadcast from termination device 14a. The destination address of the broadcast ARP is to each and every node within the network, and continues on until all nodes have received the resolution protocol, as shown by block 50. Contained within the resolution protocol may be an IP address of destination termination device 14b (e.g., FIG. 8). If so, then device 14b replies, as shown in block 52. That reply represents an ARP answer forwarded back across the network and eventually to the originating termination device 14a. Based on the broadcast of addresses and ensuing replies, the positions of termination devices relative to end Routing Switches can be determined based on the IP address of those destination and origination devices. Accordingly, the address at destination device 14b is found based on its IP address being broadcast, as shown by block 54. That address and its configured location relative to end Routing Switch 16b will thereby resolve their connectivity relationship, as shown by block 56. It should be noted that any industry standard mechanisms may be used in various embodiments instead of the ARP.

Blocks 50-56 illustrate a mechanism for determining the relative location of termination devices, nodes, and Routing Switches according to well-known address resolution protocols. Accordingly, the technique of broadcasting an address (e.g., Ethernet address) across the network to resolve locations hereof is backward compatible with existing legacy location mechanisms known to the skilled artisan. However, it is from the resolved locations that a packet can be quickly transferred between locations external to the present transport ID based network (i.e., termination devices or a non-structured, conventional network).

Transfer of a wrapped packet, such as illustrated in FIG. 5, from an originating termination device 14a to a destination termination device 14b is shown in block 58, and entails mechanism 60. Other protocols or domains outside of IP can be wrapped using the present technique, and therefore FIG. 9 is merely an example of one way in which a generic protocol (e.g., IP can be wrapped). Referring to the examples of both FIGS. 8 and 9, reference numeral 60 illustrates an incoming IP packet wrapped by end Routing Switch 16a and simply having a source address (SA) of origination termination device 14a and a destination address (DA) of exit end Routing Switch 16b. The wrapped packet is shown as reference numeral 62. More specifically, entry end Routing Switch 16a merely wraps an existing packet with a known identification address of an exit end Routing Switch, known in its relationship to a destination termination device by virtue of the address resolution protocol. Moreover, the destination termination device address is contained within the IP packet of wrapped packet 62.

Before sending the wrapped packet onto the transport ID based network, entry end Routing Switch 16a converts only the source address from that of termination device 14a to that of the entry end Routing Switch 16a, if multiple termination devices are attached to the end Routing Switch, as shown by the wrapped packet 64. Knowing the source address as the entry end Routing Switch address proves beneficial when the destination termination device replies to the originating termination device, as will be discussed herein below. The destination address and the IP packet remain the same, as illustrated by comparison between wrapped packet 62 and wrapped packet 64.

Once the wrapped packet is received upon the exit end Routing Switch 16b, only the destination address changes from exit end Routing Switch 16b to destination termination device 14b especially if there are multiple termination devices attached to end Routing Switch 16b. The source address, however, remains the same as that which was changed when the packet is forwarded into the transport ID based network. Given that the destination address is termination device 14b, exit end Routing Switch 16b performs the single, and only look-up, needed by the entirety of the transport ID based network. As defined herein, look-up is a deterministic, static, 1-to-N mapping to a localized device from among many such devices.

Mapping proceeds from the destination address placed on the wrapped packet by the exit end Routing Switch 16b in order for the IP packet to be directed to the appropriate termination device by comparing the IP address within that packet with the appropriate IP identification number of a possible x number of termination devices, as shown by translation table 68. Mapping table 68 may be formed within memory of end Routing Switch 16b or, alternatively, a selection unit such as multiple multiplexers, or any other form of routing based on selection signals. Mapping is performed by comparing the destination address (IP address) within wrapped packet 66 with the IP identification number stored in an appropriate termination device $T_x$. When the comparison yields a match, the packet is forwarded to the appropriate termination device (e.g., termination device 14b as opposed to numerous other termination devices connection to end Routing Switch 16b).

Any reply to the initial forwarded address can be sent back across the transport ID based network based on the format of wrapped packet 66. More specifically, the source address of the reply remains the address of termination device 14b, however, the destination address is the previous source address—i.e., the address of entry end Routing Switch 16a. In this manner, reply information is made similar to the initial forwarded information. Regardless of the initial request or a subsequent response, the packets of data are routed to the opposing end Routing Switch. In particular, information from termination device 14a is directed to exit end Routing Switch 16b, while reply information from termination device 14b is directed to entry end Routing Switch 16a. The source address is therefore said to change whenever a packet enters the network, however, the destination address remains the same. The same applies to a reply. Whenever a packet exits the network, only the destination address changes with the source address remaining the same. This ensures that when traversing the entire transport ID based network between termination devices, only a single mapping or translation occurs when forwarding the packet outside the transport ID based network to one of a plurality of termination devices. Intermediate Routing Switches and/or nodes of the network do not perform conversion of the destination or source addresses, nor do they perform any look-up.

The look-up arises from a relatively small table, known alternatively as a translation table. Importantly, the number of termination devices linked to the exit end Routing Switch on a request operation (or an entry end Routing Switch on a reply operation) is relatively small. It will be appreciated that the transport ID based network can form a subnet within a larger, conventional network. In this manner, the hierarchical decoding and single mapping applies to data traversing the transport ID based network, that data being packets which are forwarded across multiple subnets where one subnet may be dedicated to the transport ID based network. Accordingly, the transport ID based network can form the entire network of subnets (intranets) as well as the internet between one or more subnets or, alternatively, can form only a portion (one or more subnets) of a conventional network. Regardless of which portion of the entire inter- and intra-network is formed by the transport ID based network, or whether the transport ID based network comprises the entire network, only one look-up (defined as a mapping function) need occur as packets exit the transport ID based network to beneficially improve overall packet throughput. Absence of traditional routing in the transport ID based network greatly enhances the speed at which packets are forwarded to their appropriate destination.

Figure 10:
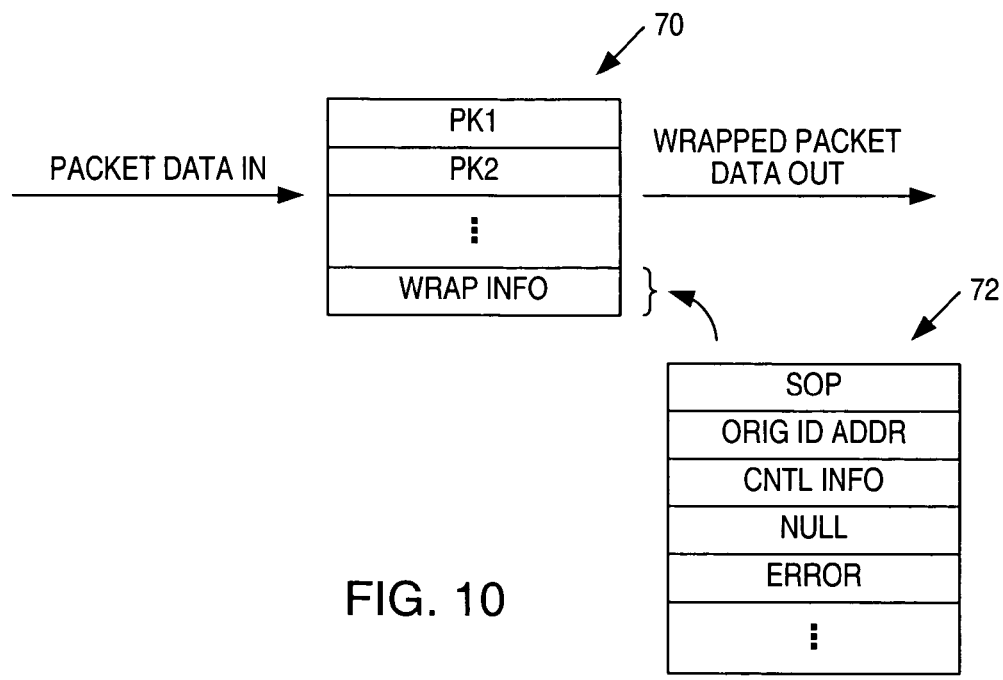
FIG. 10 is a diagram illustrating a buffer of the traffic manager within an end Routing Switch, wherein the buffer is placed within a data path and contains wrap information to be appended to data as it traverses the buffer.

FIG. 10 illustrates a memory area within a memory (or buffer) of an end Routing Switch such as 16b in FIG. 8. Memory area 70 may be bifurcated into regions, some of which receive certain packets placed in a defined order within those regions. That is, the first packet (PK1) is forwarded into and placed within a defined portion of buffer 70 before the second packet (PK2) is placed and stored. Buffer 70 therefore serves as a FIFO buffer, for example. The incoming packets are wrapped as they leave buffer 70 by attributing wrap information to a particular packet before forwarding the wrapped packet from the buffer. Wrap information is stored in another region of buffer 70 and can include but is not limited to the information shown in table 72. That information may comprise a grouping of bits indicating a start of packet (SOP). Another group of bits are used to indicate the originating transport ID of the originating Routing Switch (ORIG ID ADDR). Another set of bits may be dedicated to general control information, such as the level of hierarchy, length of packet header (or footer), packet types, etc. Yet another group of bits are dedicated to forwarding a null pattern used possibly to indicate spacing between wrapped packets. Yet another set of bits may be used to indicate an error in the packet transmission. It is recognized that the wrap information 72 can include numerous other bits dedicated to achieving many dissimilar functions, only a small grouping of which is shown by the examples provided.

Figure 11:
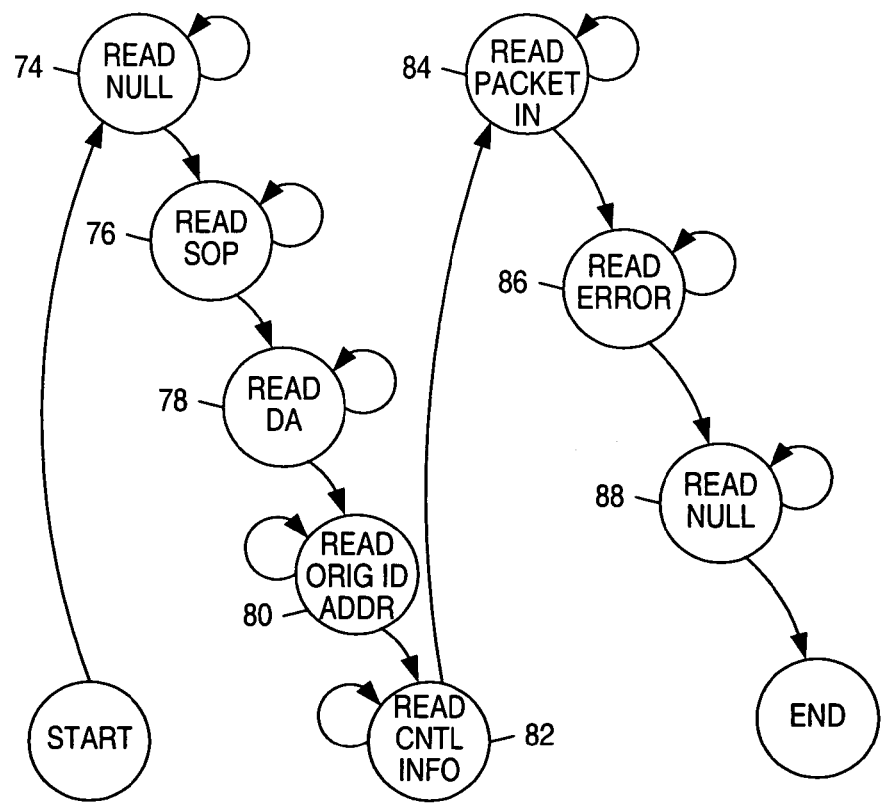
FIG. 11 is a state diagram of a sequence of reads issued to the buffer of FIG. 14 from the traffic controller for appending or wrapping the data as it traverses the buffer.

The manner in which the wrap information is wrapped about a packet is further described in reference to FIG. 11. More specifically, description of FIG. 11 is applicable when referring to FIG. 11 in conjunction with FIG. 4. FIGS. 4 and 11 illustrate traffic manager 34 operating as a compiler which performs a series of read operations upon a buffer. Those read operations occur to fixed regions of that buffer so as to read bits from those regions in a particular sequence so that the resulting wrapped packet is serially fed from the buffer in a particular order. As such, the compiler part of the traffic controller can be thought of as containing a state machine of sequential logic which performs a first read of a null pattern 74 indicating the end of the prior wrapped data packet. The read null pattern is contained within the wrap information of the buffer, as well as other wrap information thereafter beginning with the start of packet at state 76. The destination address of the transport ID based network protocol is thereafter read at state 78, and the originating identification address is read at state 80. Control information within the wrap information region of the buffer is then read at step 82, and so forth for the remaining read operations 84, 86, and 88 to complete the wrap of a packet from the buffer. Each read or fetch occurs to a specific location within memory to routinely drawn whatever information is present in that location. Thus, the wrap information is configured in specific regions of the memory so that they can be drawn from those regions in the order specified by the state machine of FIG. 11. Other types of compilers might be substituted for the traffic manager 34.

The Routing Switch which has a traffic manager (such as 34) performing the various read operations is considered an end Routing Switch and, more specifically, an entry end Routing Switch. The entry end Routing Switch wraps the incoming IP packet with various wrap information needed to transfer that IP packet across the transport ID based network and, additionally, to a termination device outside of the transport ID based network. Therefore, the transport ID based network is backward compatible with all other existing networks and protocols, with the wrap information simply subsuming the pre-existing wrap information. The entry end Routing Switch adds the wrap information and exit end Routing Switch removes or strips the wrap information, as shown in FIG. 12.

Figure 12:
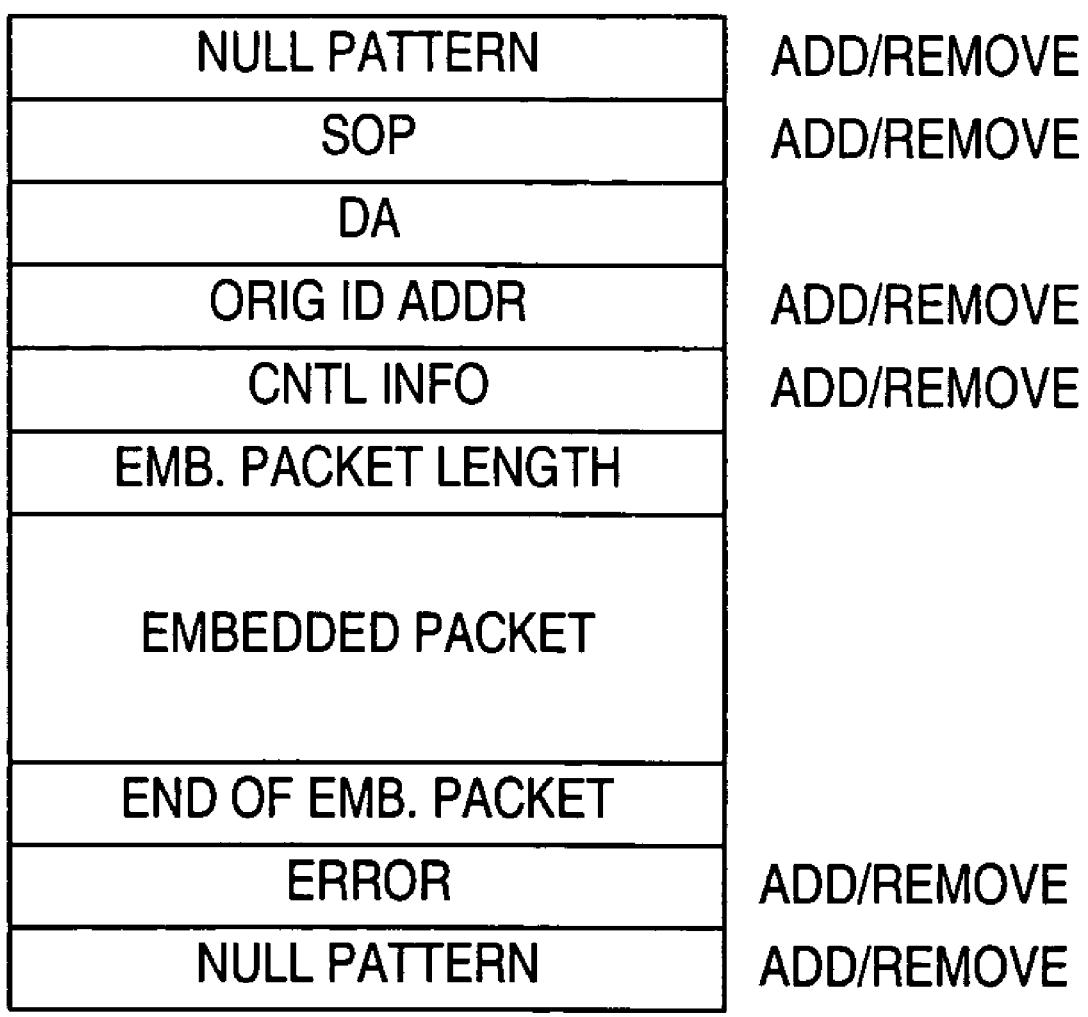
FIG. 12 is a block diagram of a packet wrapped in accordance with the sequence of read cycles shown in FIG. 15, and forwarded across the structured hierarchical network.

FIG. 12 further illustrates bits added to and removed from an embedded packet (e.g., Ethernet packet). The wrapped packet 90 shown in FIG. 12 is but one example of a packet format used by the transport ID based network 10 of the present invention. There may be additional bits or field of bits added to the format, if desired. The entry end Routing Switch thereby, adds the wrap information and the exit end Routing Switch removes the wrap information to yield only the embedded packet with starting and ending identifiers forwarded to a termination device or to other non-structured subnets outside of the present transport ID based network.

It will be appreciated to those skilled in the art having the benefit of this disclosure that the various embodiments herein are believed to be capable of performing fast and efficient transfers across a transport ID based network which either replaces or forms at least a portion of a conventional communication network. Various modification and changes may be made as would be obvious to a person skilled in the art having the benefit of this disclosure. It is intended that the following claims be interpreted to embrace all such modifications and changes and, accordingly, the specification and drawings are to be regarded in an illustrative rather than a restrictive sense.

What is claimed is:

1. A network for transporting packets of data comprising:
a plurality of interconnected routing switches each having one or more unique transport identification which reflects network topology;
each routing switch performing a different function based on said routing switch operating as an entry, exit, pass-through, or intermediate routing switch;
wherein said entry routing switch functions to embed destination transport identification in each data packet; and
wherein said intermediate routing switch is operable for comparing said destination identification with the routing switch unique transport identification and forwarding said packet of data based on said comparison without performing a table look-up.

2. The network as recited in claim 1, wherein the said destination identifications are independent of MAC and IP data communications protocol.

3. The network as recited in claim 1, wherein the transport identification is assigned based on the position within the network of the respective routing switches.

4. The network as recited in claim 1, wherein each routing switch has a set of bits within a first grouping of bits that is different from a set of bits also within the first grouping of bits representing another routing switch.

5. The network as recited in claim 1, said transport identification having divided into several groupings of bits, wherein a first grouping of said several groupings of bits identifies a first level for receiving data of the network prior to a second grouping of said several groupings of bits identifying a second level for receiving the data from the first routing switch.

6. The network as recited in claim 1, the routing switches being aggregated into two or more groups of routing switches, said transport ID being indicative of the particular group where the routing switch is a member.

7. The network as recited in claim 6, the groups being aggregated based on the topology of the network.

8. The network as recited in claim 7, the network topology being selected from: mesh, ring, linear, or hierarchical topology.

9. A method of transporting data packets across a network comprising:
embedding a destination transport identification to a data packet when the data packet enters the network;
connecting a plurality of routing switches within the network with the routing switches grouped into two or more groups within the network based on network topology;
assigning a unique transport identification number to each routing switch indicative, at least in part, of the network topology;
comparing the destination transport identification of a packet with the transport identification of a routing switch; and
forwarding the data packet through the network based on said comparison of destination transport identification.

10. The method of claim 9, wherein the embedded destination identification is independent of a communication protocol of the network.

11. The method of claim 9, wherein the network operates as a subnet within a large network.

12. The method of claim 9, including an initial routing switch for receiving the data packet, reading the intended destination of the data packet, and embedding the destination identification.

13. The method of claim 9, including a termination routing switch performing the substeps of stripping the transport destination identification from the data packet and passing the data packet to another network or termination device.

14. The method of claim 9, wherein at least several groups comprise topological levels and each level includes one or more nodes of one or more routing switches connected for transporting data packets between nodes.

15. A communication network, comprising:
    first and second sets of routing switches wherein the first set of routing switches receives data traversing the network having network topology-based transport identification before the second set of routing switches receives the data;
    a unique transport identification number in memory attributed to each of the routing switches, wherein each of said transport identification numbers contains network topology information, said transport identification numbers being divided into a first and second field of bits which identify respective said first and second sets of routing switches;
    one or more decoders within the first set of routing switches operable to compare a portion of the destination network topology-based transport identification of said data with said first field to determine next hop routing for said data; and
    one or more decoders within the second set of routing switches operable to compare the destination network topology-based transport identification of said data with said second field after a first set decoder has compared the network topology-based transport identification with said first field.

16. The communication network as recited in claim 15, wherein a first set decoder compares the destination network to topology-based transport identification of said data with said first field to determine routing of said data to said second set of routing switches.

17. The communication network as recited in claim 15, wherein the first set comprises a first hierarchical level and the second set comprises a second hierarchical level different than the first hierarchical level.

18. The communication network as recited in claim 15, wherein the first set of routing switches are connected to at least one loop dissimilar from at least another loop onto which the second set of routing switches are connected.

19. The communication network as recited in claim 15, wherein the first set of routing switches are connected within a first set of loops that are associated with a first set of network nodes, each of the interconnected first set of network nodes being configured within a first hierarchical level.

20. The communication network as recited in claim 19, wherein the second set of routing switches are connected within a second set of loops that are associated with a second set of network nodes, each of the interconnected second set of nodes being configured within a second hierarchical level.

21. The communication network as recited in claim 20, wherein at least one network branch is coupled by a routing switch within the first set of routing switches and a routing switch within the second set of routing switches for coupling the first set of network nodes to the second set of network nodes to provide a selectable routing path.

22. The communication network as recited in claim 21, wherein the network nodes extend between terminating devices and form data flow paths therebetween.

23. The communication network as recited in claim 21, wherein the first set of network nodes and associated first set of routing switches serve to route data flow across the data flow paths targeted for a hierarchical level dissimilar than the first hierarchical level containing the first set of network nodes, and wherein the second set of network nodes and associated second set of routing switches serve to route data flow across the data flow paths targeted for a hierarchical level dissimilar from the second hierarchical level.

24. A method of structuring an unstructured network comprising:
    providing a plurality of routing switches within the network, each having at least one transport ID, wherein the transport ID is a unique number that is independent of MAC and IP network addressing schemes and is based, in part, on network topology;
    grouping the routing switches into groups based on hierarchical position within the network;
    determining the destination transport ID of a routing switch having an attached destination device;
    attaching said destination transport ID to each packet directed to said destination device; and
    passing data packets over the network, including the step of forwarding the data packets to said destination device based on comparison of said destination transport ID with said transport ID of said routing switch.

25. The method of claim 24, wherein the position of a group is based on the physical relationship between routing switches.

26. The method of claim 24, wherein the position of a group is based on the logical relationship between routing switches.

27. The method of claim 24, wherein the grouping is independent of network topology.

28. The method of claim 24, wherein the grouping is based on the network topology.

29. A network for transporting packets of data, each having a destination identification, comprising:
    a plurality of interconnected routing switches each having at least one assigned unique transport identification;
    the transport identification reflecting the structure and topology of the network;
    wherein said transport identification assigned to a routing switch is indicative of the position of the routing switch in the network; and
    said routing switches being operable for comparing a data packet destination identification with the routing switch transport identification and operable for forwarding said data packet based on said comparison without requiring a table lookup.

30. The network as recited in claim 29, wherein said destination identification includes a transport identification embedded upon entry of a packet into the network independent of MAC and IP data communications addressing.

31. The network as recited in claim 29, the routing switches being aggregated into two or more groups of routing switches, said routing switches transport identification being indicative of the particular group where the routing switch is a member.

32. The network as recited in claim 31, the groups being aggregated based on the topology of the network.

* * * * *

UNITED STATES PATENT AND TRADEMARK OFFICE
CERTIFICATE OF CORRECTION

| | | |
|---|---|---|
| PATENT NO. | : 7,778,259 B1 | Page 1 of 1 |
| APPLICATION NO. | : 10/866358 | |
| DATED | : August 17, 2010 | |
| INVENTOR(S) | : Mahalingaiah | |

It is certified that error appears in the above-identified patent and that said Letters Patent is hereby corrected as shown below:

IN THE CLAIMS:

Claim 16 at col. 21, line 42: Before "topology-based" please delete "to".

Signed and Sealed this

Thirtieth Day of November, 2010

David J. Kappos
*Director of the United States Patent and Trademark Office*